Dec. 11, 1934.    W. L. REINHARDT.    1,983,995
APPARATUS FOR DRYING STORAGE BATTERY PLATES
Original Filed March 7, 1927
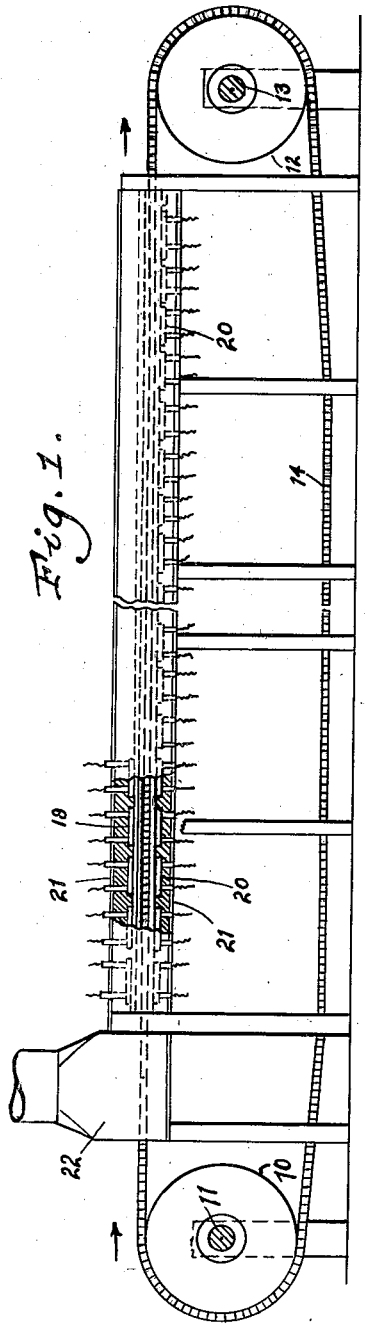
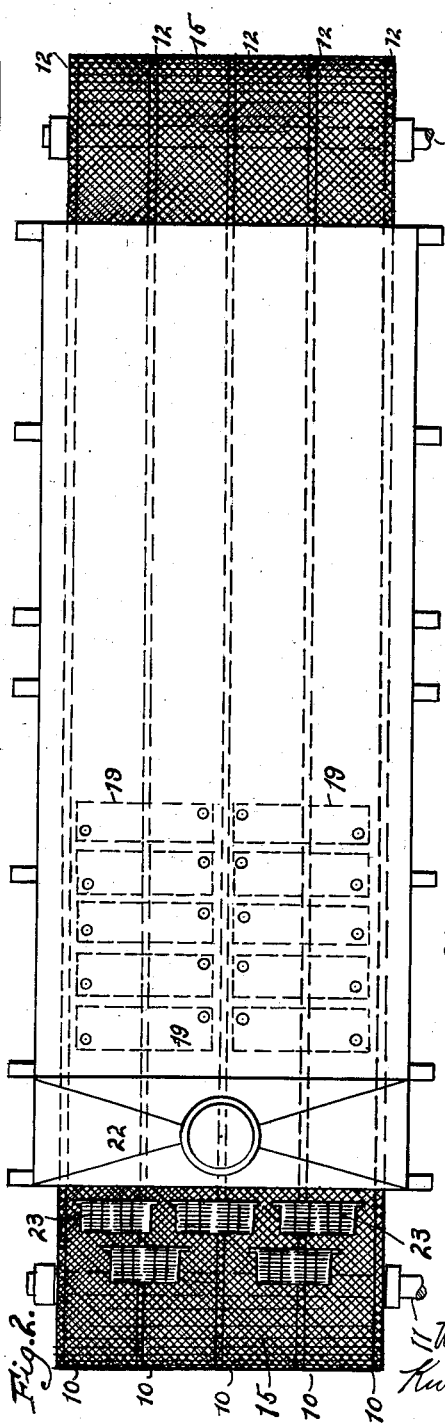
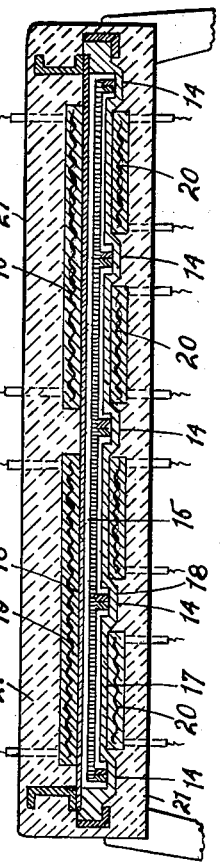
Inventor
Willard L. Reinhardt
Kwis Hudson & Kent
attys.

Patented Dec. 11, 1934

1,983,995

UNITED STATES PATENT OFFICE 1,983,995

APPARATUS FOR DRYING STORAGE BATTERY PLATES

Willard L. Reinhardt, East Cleveland, Ohio, assignor to Willard Storage Battery Company, Cleveland, Ohio, a corporation of West Virginia Original application March 7, 1927, Serial No. 173,354. Divided and this application December 26, 1930, Serial No. 504,785

4 Claims. (Cl. 34—12)

This invention relates to apparatus for drying storage battery plates, and particularly charged negative plates the active material of which consists of sponge lead which is very susceptible to oxidation, especially in the presence of moisture.

The drying of charged negative plates is necessary where it is desirable to store them until their use is required at some later date, and it is also necessary where they are to be used in storage batteries designed to be shipped in a dry state, that is, without electrolyte. Where so used, the battery can be kept in a dry state almost indefinitely without material loss of charge or capacity, particularly if moisture is excluded from the plates, and it can be made ready for use simply by the addition of the electrolyte, the battery then having substantially its original capacity.

On account of their susceptibility to oxidation, great care must be exercised in the operation of drying the negative plates. Various drying methods have been resorted to, most of which, however, depend upon the principle of applying to the plates an inert gas that has been preliminarily heated. Such methods have been found to be expensive and cumbersome, due to the fact that elaborate equipment is necessary in order to apply the heated inert gas to the plates. Also in these operations there is a considerable heat loss which adds to the expense.

The present invention resulted from an effort to attack the problem from a quite different angle. If air is not present during the drying operation there will be no oxidation at that time. Air cannot be present in any appreciable degree if the space around the plates is filled with other gases.

The invention has to do with an apparatus for carrying out the method described and claimed in United States Patent No. 1,806,181 issued on my copending application Serial No. 173,354, filed March 7, 1927, of which the present application is a division, wherein the plates are dried in an atmosphere of their own vapor. In order to accomplish this, the space around each plate is so constricted that it can be continuously filled with this vapor, thereby excluding air entirely or nearly so. The exact extent of the space upon the sides of the plate which can be utilized for vapor will vary with conditions of temperature, speed of travel of the plate through the drying oven where a conveyor is employed, the degree of wetness of the plate, etc. I prefer to employ compartments with spaces of a width just sufficient to permit the easy insertion and withdrawal of the plates, but my experiments indicate that a space as wide as one inch may be employed under some conditions without any appreciable oxidation occurring.

Obviously, the temperature of the oven must be maintained below the melting point of lead and it should be somewhat above the boiling point of water, but it may vary considerably between these limits, and in fact I prefer to apply a relatively large amount of heat during the early part of the drying operation and to gradually decrease the amount of heat as the end of the drying operation is approached. Indirect heating of the spaces referred to should, of course, be employed, that is the heat carriers should not come into direct contact with the plates to be dried, but as to the means for applying heat exteriorly to the walls of the spaces, the field of selection is not at all limited, that is, it may be by direct flame, electric heating coils, circulation of hot air, hot oil or steam, or by any other known means.

It is to be understood, of course, that prior to the drying operation which is the subject of the present invention the negative plates are pasted in the usual manner and are then subjected to the regular charging or forming process wherein the lead oxide of the negative plates is electrolytically converted to sponge lead. There may or may not be drying between the pasting and forming or charging operations. After forming, the plates may or may not be subjected to a washing operation to remove excess acid.

In the event that the plates are not dried immediately after being formed, they may be immersed in some liquid, such as water, to prevent oxidation while they are waiting to be put through the drying operation.

One of the objects of the invention therefore is the provision of an apparatus for the drying of negative storage battery plates without substantial oxidation, which apparatus shall be capable of use in a continuous process, and in the use of which no inert material foreign to the plates themselves need be employed.

Other objects and features of novelty will appear as I proceed with the description of that embodiment of the invention which, for the purposes of the present application, I have illustrated in the accompanying drawing, in which Figure 1 is a diagrammatic illustration, principally in vertical section, of an endless conveyor passing through an electrically heated oven, the plates entering the oven in their wet condition and emerging at the opposite end in a dry condition.

Fig. 2 is a plan view of the apparatus shown in Fig. 1.

Fig. 3 is a cross section of the same upon a somewhat larger scale.

In the drawing a set of sprocket wheels 10 are shown keyed to a shaft 11 at one end of the apparatus while another set of similar wheels 12 connected to a shaft 13 are mounted for rotation at the opposite end of the apparatus. Power may be applied to one or both of the shafts 11 and 13. Chains 14, all of identically the same length, run over aligned sprockets 10 and 12, and secured to these chains is an endless carrier 15 of foraminous material as, for instance, wire mesh.

The upper flight of the carrier is arranged to run through an oven or heating chamber which may be built up in any desired manner so long as the heating space is in the nature of a slot running through the oven from one end to the other. As illustrated herein, the top of this space is formed by a metal plate 16 and the bottom by metal castings 17 provided with gutters 18, one for each chain. Above the plate 16 and below the castings 17 are electric heating coils 19 and 20 respectively, by means of which the metal walls of the oven may be heated to the desired extent. Preferably the degree of heating at the feeding end of the oven, shown at the left in Figs. 1 and 2, is greater than at the discharge end, decreasing gradually as the plates travel through the oven, this effect being obtained preferably by the design or arrangement of the heating coils. The oven parts thus far described are preferably enclosed and insulated by a composition of low heat conducting qualities indicated at 21 in the drawing.

At the receiving or feeding end of the oven there may be, and preferably should be, a hood 22 with a flue, the hood being of a width equal to the width of the oven and connected with the aforesaid slot so that vapors given off from the plates may find an exit without being disseminated in the room. A strong draft through the flue should be avoided however.

In the operation of the apparatus described, one or more attendants feed plates to the oven by placing them as close together as possible upon the top of the conveyor at the end of the machine shown at the left in Figs. 1 and 2. The plates in this position are indicated at 23 in the drawing. The travel of the conveyor is continuous. As soon as the plates get into the oven the relatively high heat maintained at the receiving end causes vapor to rise rapidly and to envelop the plates, thereby driving out the air which had been present previously. As the heating continues further vapor is, of course, given off and that which cannot find space around the plates is crowded into the space beneath the hood 22 and passes then through the flue and out to atmosphere, or, if desired, it may be condensed by any suitable means, such means forming no part of my present invention. As the plates progress in their travel through the machine, less and less vapor is given off and less and less heat applied until they finally emerge at the opposite end dry.

It will be observed that when once the oven is placed in operation and the air has been excluded by the vapors given off from the plates, the drying operation can be carried on continuously without any change in the condition of the interior of the oven insofar as the presence of air is concerned. When once the process is under way, that portion of the drying zone which is within the hood 22 becomes filled with warm vapor given off by the plates within the oven. Hence, as the plates enter the hood they are at once surrounded by this inert vapor and remain therein until they enter the heated space within the oven.

The air may or may not be excluded from the interior of the oven for its full length, this being determined largely by the design and arrangement of the heating units or other means for heating the oven. That is to say, if the major portion of the moisture is extracted near the inlet portion of the oven, and if the plates are thoroughly dried before reaching the outlet end, it is immaterial whether or not that portion of the oven at or adjacent the outlet end contains air or a mixture of air and vapor.

On the other hand, air may be excluded from the oven for its full length, this being obtained by so arranging or designing the heating units that the drying takes place more uniformly throughout the length of the oven, in which event the vapor will emerge from both ends of the oven. Even under these circumstances the major portion of the drying may be caused to take place between the inlet end of the oven and the middle thereof, in which case most of the vapor will float or drift out of the inlet end and a relatively small portion from the outlet end of the oven, but the flow of vapor toward and from both ends will be sufficient to keep the oven substantially free of air.

The important feature in this regard is the fact that the air is excluded from that portion of the oven which is utilized in the actual drying operation, and if the plates are substantially dry at a distance from the outlet end, it is immaterial whether at and adjacent the outlet end air is present either to the exclusion of vapor or whether this portion of the passage is filled with vapor more or less diluted with air.

While in the apparatus illustrated and described herein means are shown for supporting the plates in horizontal position, it should be understood that the invention contemplates supporting them in vertical or inclined positions as well, the particular arrangement of the plates being immaterial. Various other changes from the disclosure herein are possible without departing from the spirit of the invention, and, therefore, I desire to have it understood that the disclosure herein is for illustrative purposes merely and should not be construed as a limitation upon my invention except as it may be included specifically in the appended claims.

My improved apparatus illustrated herein has proved by actual practice to be very efficient insofar as the cost of operation is concerned. The moisture is extracted very thoroughly at low cost and the plates are in excellent condition after the drying operation. By the latter is meant that they have been dried without any material oxidation and, therefore, without loss of capacity, and the active material has suffered little if any shrinkage and cracking. The latter result is due partly to the fact that the plates are charged or formed immediately or shortly after the pasting operation and without any intermediate drying, the result being that the active material is "set" in the charging or forming operation and before being dried. Secondly, the condition of the plates when dried by my apparatus is better than that of plates which, in the drying operation, are subjected suddenly to drying heat as has been common heretofore. In such cases the sudden application of fairly high heat causes the surfaces of the plates to dry very rapidly, tending to contract the material at the surface and to trap the moisture within, causing what is known as surface hardening. Then, as the heat penetrates the plate, this moisture vaporizes and must escape, and in doing so it ruptures and cracks the surface of the plate, which reduces greatly its ability to stand service without disintegration. In the use of my apparatus, on the other hand, the plates before entering the heated space pass slowly through the warm vapor standing or moving slowly in the hood 22, and in consequence thereof the whole body of each plate and the moisture contained therein are preliminarily warmed. Hence when the plates pass through the oven or heated space the tendency to surface dry is greatly reduced and the vapor is dispelled without cracking the surface of the material.

I have described my invention in connection with the drying of charged negative storage battery plates, and when so used my invention has special utility, but of course the charged positive plates can be dried also with my improved apparatus although the positive plates are not adversely affected by oxidation and are generally air-dried.

Having thus described my invention, I claim:

1. In a drying apparatus, a horizontal slot-like chamber, the lower wall of said chamber having spaced horizontal grooves, a conveyor having endless flexible connections running in said grooves, foraminous material supported upon and secured to said connections, and means for heating the walls of said chamber.

2. In a drying apparatus, a horizontal slot-like chamber, the lower wall of said chamber having spaced horizontal grooves, a conveyor having endless flexible connections running in said grooves, foraminous material supported upon and secured to said connections, means for heating the walls of said chamber, and a vented hood connected to the intake end of said chamber.

3. In a drying apparatus, a horizontal slot-like chamber, one wall of said chamber having spaced horizontal grooves, a conveyor having endless flexible connections running in said grooves, foraminous material supported by and secured to said connections, and a vented hood connected to the intake end of said chamber.

4. In a drying apparatus, a horizontal slot-like chamber, one wall of said chamber having spaced horizontal grooves, a conveyor having endless flexible connections running in said grooves, foraminous material supported by and secured to said connections, and means for heating the walls of said chamber, the heating means for the grooved wall of said chamber being positioned between the grooves in said wall.

WILLARD L. REINHARDT.